United States Patent
Khan

(10) Patent No.: US 7,835,750 B2
(45) Date of Patent: Nov. 16, 2010

(54) MULTI-CARRIER WIRELESS NETWORK USING FLEXIBLE FRACTIONAL FREQUENCY REUSE

(75) Inventor: Farooq Khan, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 549 days.

(21) Appl. No.: 11/517,877

(22) Filed: Sep. 8, 2006

(65) Prior Publication Data
US 2007/0081449 A1 Apr. 12, 2007

Related U.S. Application Data

(60) Provisional application No. 60/724,863, filed on Oct. 7, 2005.

(51) Int. Cl.
*H04W 40/00* (2009.01)
(52) U.S. Cl. ............... 455/447; 455/451; 455/452.1; 455/453
(58) Field of Classification Search .......... 455/447, 455/450–453, 443, 464, 524, 33.1, 34.1, 455/56.1; 370/395.2–395.43
See application file for complete search history.

(56) References Cited

U.S. PATENT DOCUMENTS

| | | | |
|---|---|---|---|
| 5,722,043 A * | 2/1998 | Rappaport et al. | 455/452.1 |
| 5,726,978 A * | 3/1998 | Frodigh et al. | 370/252 |
| 6,751,444 B1 | 6/2004 | Meiyappan | |
| 2002/0119781 A1 | 8/2002 | Li et al. | |
| 2002/0147017 A1 * | 10/2002 | Li et al. | 455/447 |
| 2003/0003913 A1 * | 1/2003 | Chen et al. | 455/436 |
| 2005/0201309 A1 | 9/2005 | Kang et al. | |

FOREIGN PATENT DOCUMENTS

| | | |
|---|---|---|
| DE | 102 49 668 A1 | 5/2004 |
| EP | 0 684 744 A2 | 11/1995 |
| RU | 2195789 C2 | 12/2002 |
| RU | 2267864 C2 | 3/2004 |
| WO | WO 94/18804 A1 | 8/1994 |
| WO | WO 98/52327 A2 | 11/1998 |
| WO | WO 99/03289 A1 | 1/1999 |
| WO | WO 01/01721 A1 | 1/2001 |
| WO | WO 01/78440 A1 | 10/2001 |
| WO | WO 2004/045228 A1 | 5/2004 |

OTHER PUBLICATIONS

Decision on Grant dated Feb. 13, 2009 in connection with Russian Patent Application No. 2008113176/09(014279).
Communication pursuant to Article 96(2) EPC dated Oct. 25, 2007 in connection with European Patent Application No. EP 06 02 1183.6.
European Search Report dated Feb. 23, 2007 in connection with European Patent Application No. EP 06 02 1183.6.

* cited by examiner

Primary Examiner—Nick Corsaro
Assistant Examiner—Chuong A Ngo

(57) ABSTRACT

A base station for use in a wireless network capable of communicating according to a multi-carrier protocol. The base station communicates with subscriber stations using a first pre-defined set of subcarriers. If the base station determines that no additional subcarriers are available in the first pre-defined set to communicate with a first subscriber station, the base station borrows subcarrier resources by selecting a first subcarrier in a second pre-defined set of subcarriers used by a first neighboring base station and allocates the first subcarrier in the second pre-defined set to communicate with the first subscriber station.

24 Claims, 10 Drawing Sheets

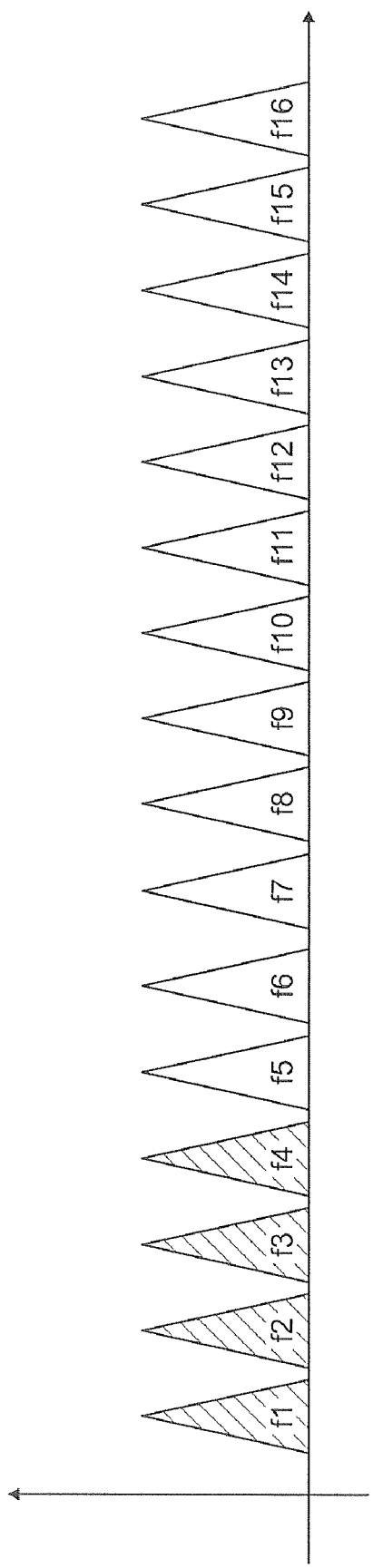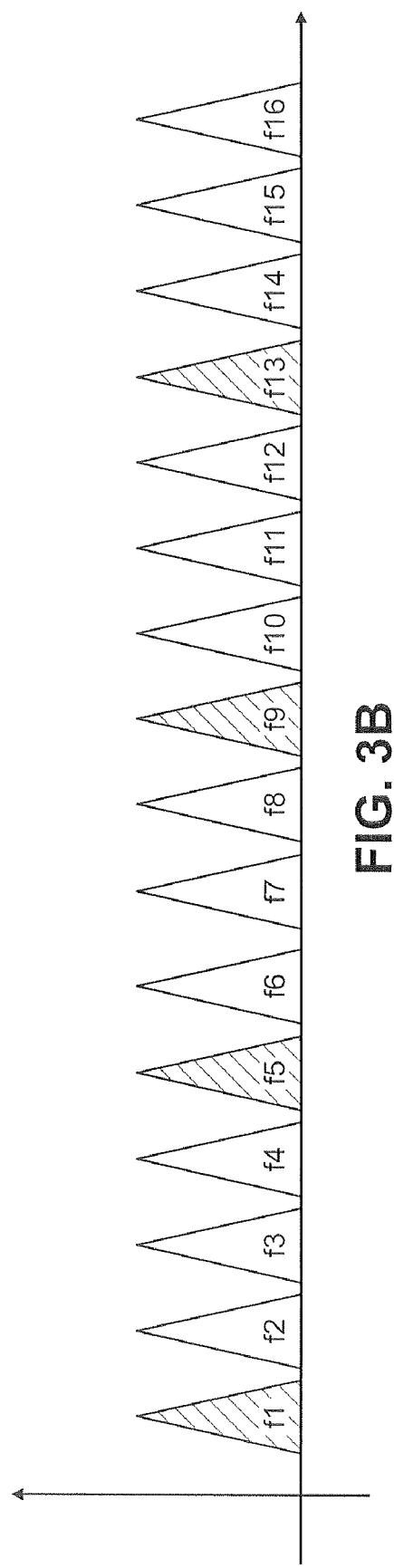

MULTI-CARRIER WIRELESS NETWORK USING FLEXIBLE FRACTIONAL FREQUENCY REUSE

CROSS-REFERENCE TO RELATED APPLICATION AND CLAIM OF PRIORITY

The present application is related to U.S. Provisional Patent No. 60/724,863, filed Oct. 7, 2005, entitled "Flexible Fractional Frequency Reuse Technique". U.S. Provisional Patent No. 60/724,863 is assigned to the assignee of this application and is incorporated by reference as if fully set forth herein. The present application hereby claims priority under 35 U.S.C. §119(e) to U.S. Provisional Patent No. 60/724,863.

TECHNICAL FIELD OF THE INVENTION

The present application relates to wireless communications and, more specifically, to a fractional frequency reuse technique for use in multi-carrier networks.

BACKGROUND OF THE INVENTION

Orthogonal frequency division multiplexing (OFDM) is a multi-carrier transmission technique in which a user transmits on many orthogonal frequencies (or subcarriers). The orthogonal subcarriers are individually modulated and separated in frequency such that they do not interfere with one another. This provides high spectral efficiency and resistance to multipath effects. An orthogonal frequency division multiple access (OFDMA) system assigns subcarriers to different users, rather than one user.

As noted, the total bandwidth of an OFDM/OFDMA system is divided into orthogonal narrowband frequency units called subcarriers. The number of subcarriers, N, is equal to the FFT/IFFT block size N used in the system. The number of subcarriers used for data may be less than N if subcarriers at the edge of the frequency spectrum are reserved as guard subcarriers. No information is transmitted on guard subcarriers.

Within an OFDM/OFDMA system, a resource unit may be defined as one or more pre-determined subcarriers that may be either contiguous or distributed. A resource set then may be defined as one or more resource units. FIG. 4 illustrates an example of frequency reuse according to a conventional embodiment of an OFDM/OFDMA wireless network. In FIG. 4, three neighboring cells—Cell A, Cell B, and Cell C—of an OFDM/OFDMA wireless network are illustrated. In the frequency reuse approach used in the prior art, a resource set is allocated to a cell on a fixed basis. Thus, Cell A is allocated Resource Set A, Cell B is allocated Resource Set B, and Cell C is allocated Resource Set C.

The fixed frequency reuse schemes used in the prior art permanently reserve a frequency band for use in a given cell. In the fixed frequency reuse approach, the reserved resources that are not used in a given cell at a given time cannot be used by other cells. Thus, unused frequency units in Resource Set A cannot be used in Cell C. This is an inefficient use of spectrum resources.

Therefore, there is a need for improved OFDM and OFDMA wireless networks that make efficient use of the available spectrum. In particular, there is a need for multi-carrier networks that are not limited to fixed frequency reuse schemes.

SUMMARY OF THE INVENTION

In one embodiment of the disclosure, a base station is provided for use in a wireless network capable of communicating according to a multi-carrier protocol. The base station communicates with subscriber stations using a first pre-defined set of subcarriers. The base station is capable of determining if additional subcarriers are available in the first pre-defined set of subcarriers to communicate with a first subscriber station. In response to a determination that no additional subcarriers are available in the first pre-defined set, the base station selects a first subcarrier in a second pre-defined set of subcarriers used by a first neighboring base station and allocates the first subcarrier in the second pre-defined set to communicate with the first subscriber station.

The base station allocates the first subcarrier in the second pre-defined set to communicate with the first subscriber station based on a determination that the first subscriber station is close to the base station (i.e., has a high signal-to-interference and noise ratio). The base station then uses a lower transmit power on the first subcarrier in the second pre-defined set compared to the power level used on the subcarriers in the first pre-defined set of subcarriers. This minimizes interference with the first neighboring base station.

Advantageously, the first subcarrier in the second pre-defined set is selected by the base station according to a determination that the first subcarrier in the second pre-defined set is the least likely one of second pre-defined set of subcarriers to be needed by the first neighboring base station.

In another embodiment of the present disclosure, a method is provided for use in a base station of a wireless network, wherein the base station communicates with subscriber stations using a first pre-defined set of subcarriers. The method comprising the steps of: determining if additional subcarriers are available in the first pre-defined set of subcarriers to communicate with a first subscriber station; in response to a determination that no additional subcarriers are available in the first pre-defined set, selecting a first subcarrier in a second pre-defined set of subcarriers used by a first neighboring base station; and allocating the first subcarrier in the second pre-defined set to communicate with the first subscriber station.

In one embodiment, the step of allocating the first subcarrier in the second pre-defined set comprises the sub-step of determining that the first subscriber station has a high signal-to-interference and noise ratio. The method further comprises the step of transmitting on the first subcarrier in the second pre-defined set at a lower power level than the base station uses to transmit on the subcarriers in the first pre-defined set of subcarriers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B illustrate subcarrier allocation for frequency-selective multi-user scheduling and frequency diversity in the exemplary wireless network;

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In the descriptions that follow, it shall be assumed generally that transmitters and receivers are operating in OFDMA mode. However, this embodiment should not be construed to limit the scope of the disclosure. In alternate embodiments, the transmitters and receivers may operate in OFDM mode or another multi-carrier mode without departing from the principles of the disclosure.

A flexible fractional frequency reuse technique is disclosed herein. Frequency resources may be borrowed from neighboring cells according to a predefined rule in the base station that minimizes subcarrier collisions between neighboring cells. Ideally, a relatively lower transmit power is used on the borrowed resource and the borrowed resource is used only for good (i.e., strongly received) subscriber stations in the cell.

Figure 1:
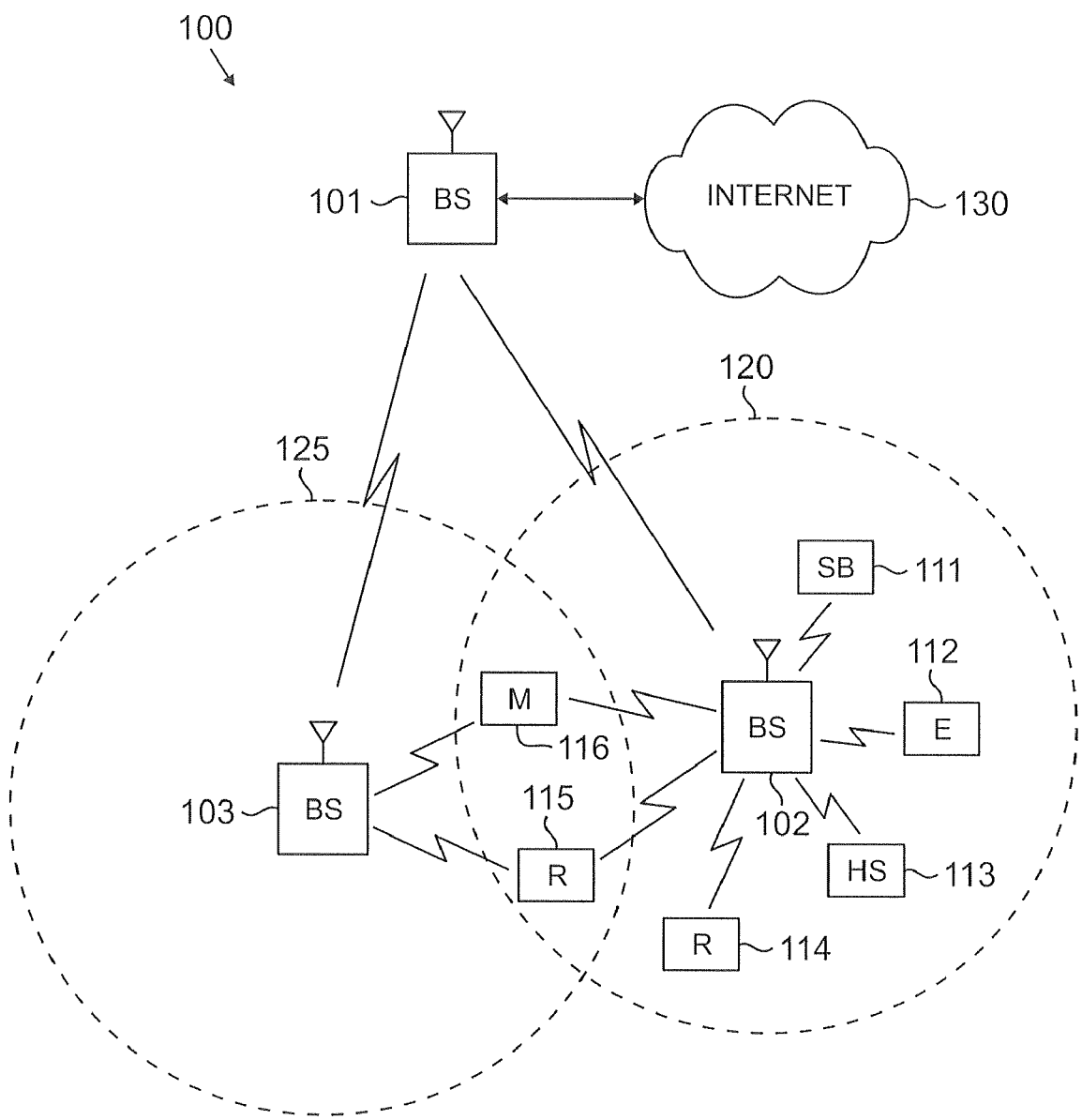
FIG. 1 illustrates an exemplary wireless network that implements fractional frequency reuse according to the principles of the present disclosure.

FIG. 1 illustrates exemplary wireless network 100, which implements fractional frequency reuse according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
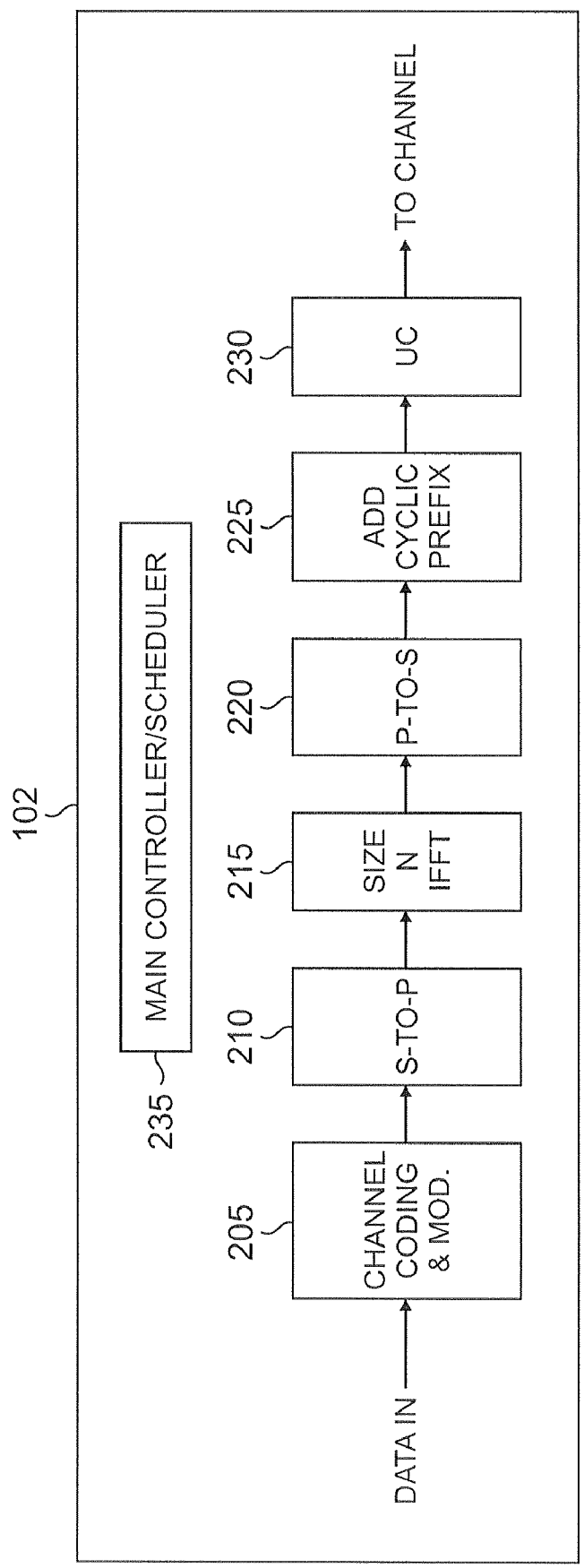
FIG. 2A is a high-level diagram of an orthogonal frequency division multiple access (OFDMA) transmit path.
Figure 2B:
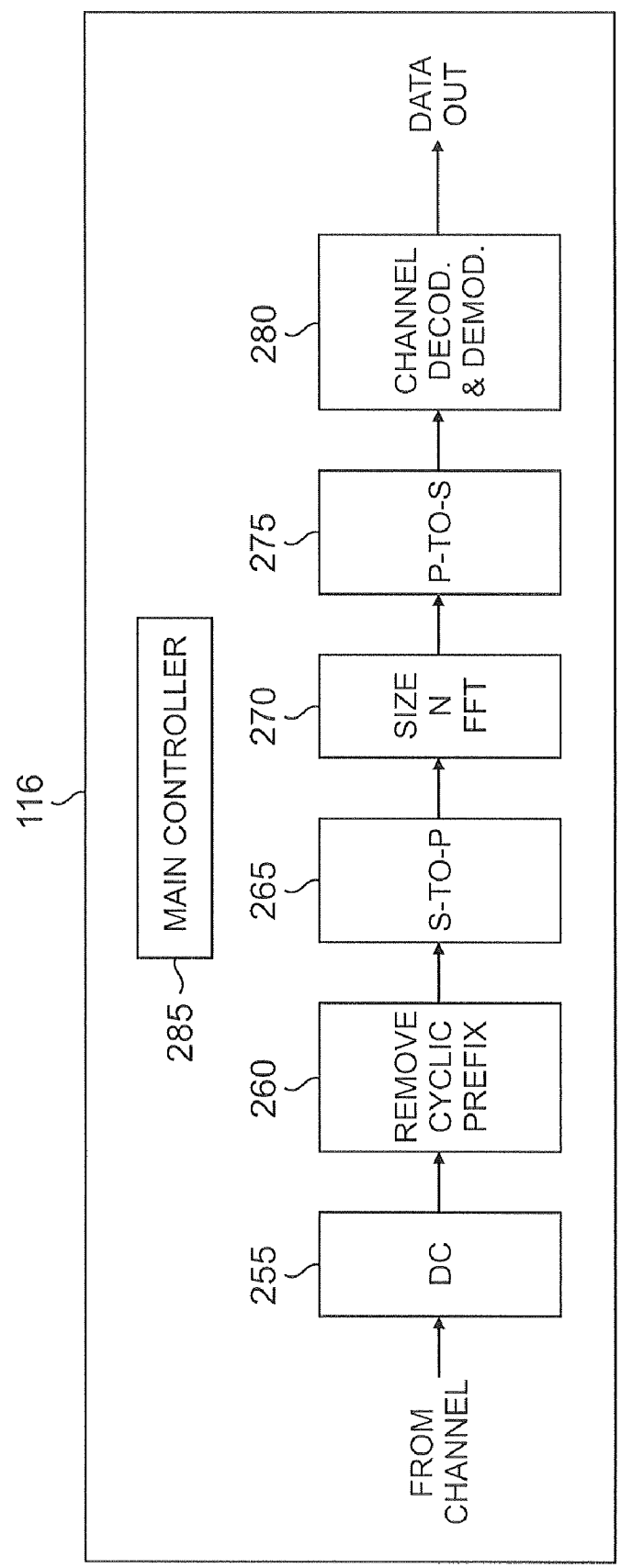
FIG. 2B is a high-level diagram of an orthogonal frequency division multiple access (OFDMA) receive path.
Figure 4:
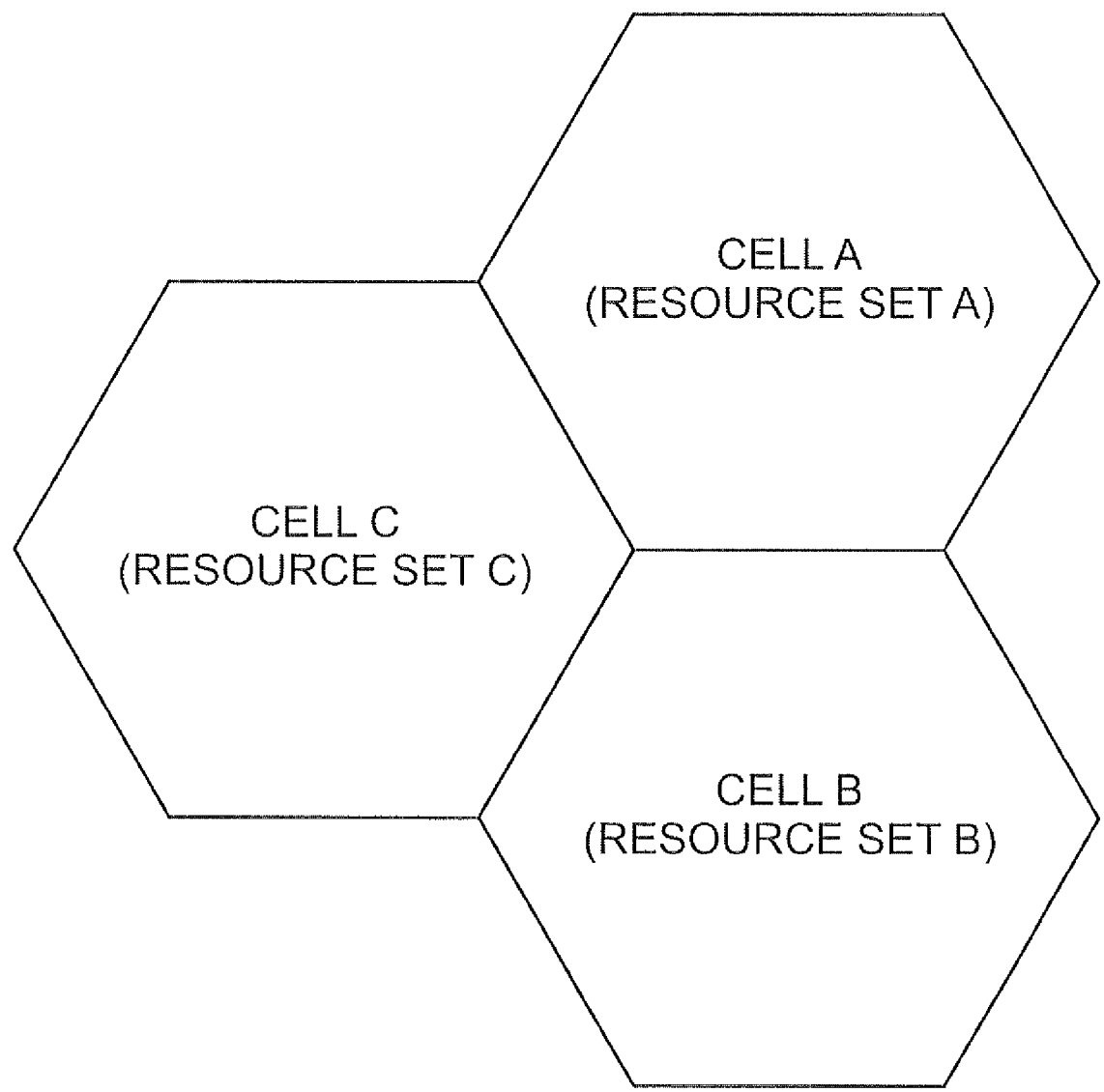
FIG. 4 illustrates an example of frequency reuse according to a conventional embodiment of an OFDM/OFDMA wireless network.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230, and main controller and scheduler 235 (hereafter, simple main controller 235). The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280, and main controller 285.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

The transmit path and receive path components described herein and illustrated in FIGS. 2A and 2B are configurable devices that may be re-programmed and controlled by main controller 235 in BS 102 or main controller 285 in SS 116. Thus, for example, main controller 235 is operable to configure modulation block 205 to adapt to different modulation techniques (e.g., BPSK, QPSK, QAM, etc.). Similarly, main controller 285 is operable to similarly configure demodulation block 280. Main controllers 235 and 285 are also operable to modify the value of Size N.

Moreover, main controllers 235 and 285 are operable to implement the fractional frequency reuse techniques described herein. By way of example, main controller 235 is operable to modify the resource set (i.e., resource units or subcarriers) used by BS 102 in order to flexibly allocate resource units according to traffic levels. Thus, main controller 235 is operable to receive, for example, the channel quality indicator (CQI) or RSSI information for SS 116 and other subscriber stations. Main controller 235 is further operable to execute the flow diagrams illustrated and described below in order to implement fractional frequency reuse.

In a communication link, a multi-path channel results in a frequency-selective fading. Moreover, in a mobile wireless environment, the channel also results in a time-varying fading. Therefore, in a wireless mobile system employing OFDM-based access, the overall system performance and efficiency may be improved by using, in addition to time-domain scheduling, frequency-selective multi-user scheduling. In a time-varying frequency-selective mobile wireless channel, it is also possible to improve the reliability of the channel by spreading and/or coding the information over the subcarriers.

FIG. 3A illustrates subcarrier allocation for frequency-selective multi-user scheduling in the exemplary wireless network. FIG. 3B illustrates subcarrier allocation for frequency diversity in the exemplary wireless network. In frequency-selective multi-user scheduling, a contiguous set of subcarriers (shaded in FIG. 3A) potentially experiencing an up-fade is allocated for transmission to one subscriber station (e.g., SS 116). The total bandwidth is divided into subbands that group multiple contiguous subcarriers, as shown in FIG. 3A, where subcarriers F1, F2, F3 and F4 (shaded) are grouped into a subband for transmission to SS 116 in frequency-selective multi-user scheduling mode. In FIG. 3A, subcarriers (or resource units) F1, F2, F3 and F4 comprise a resource set.

However, in frequency-diversity transmission, the allocated subcarriers (shaded in FIG. 3B) are preferably uniformly distributed over the whole spectrum, as in the case of subcarriers F1, F5, F9, and F13. In FIG. 3B, subcarriers (or resource units) F1, F5, F9, and F13 comprise a resource set. The frequency-selective multi-user scheduling is generally beneficial for low mobility users for which the channel quality can be tracked. However, the channel quality generally cannot be tracked for highly mobile devices, particularly in a frequency division duplex (FDD) system where the fading between the downlink and uplink is independent due to channel quality feedback delays. Thus, frequency diversity transmission mode is preferred.

Figure 5:
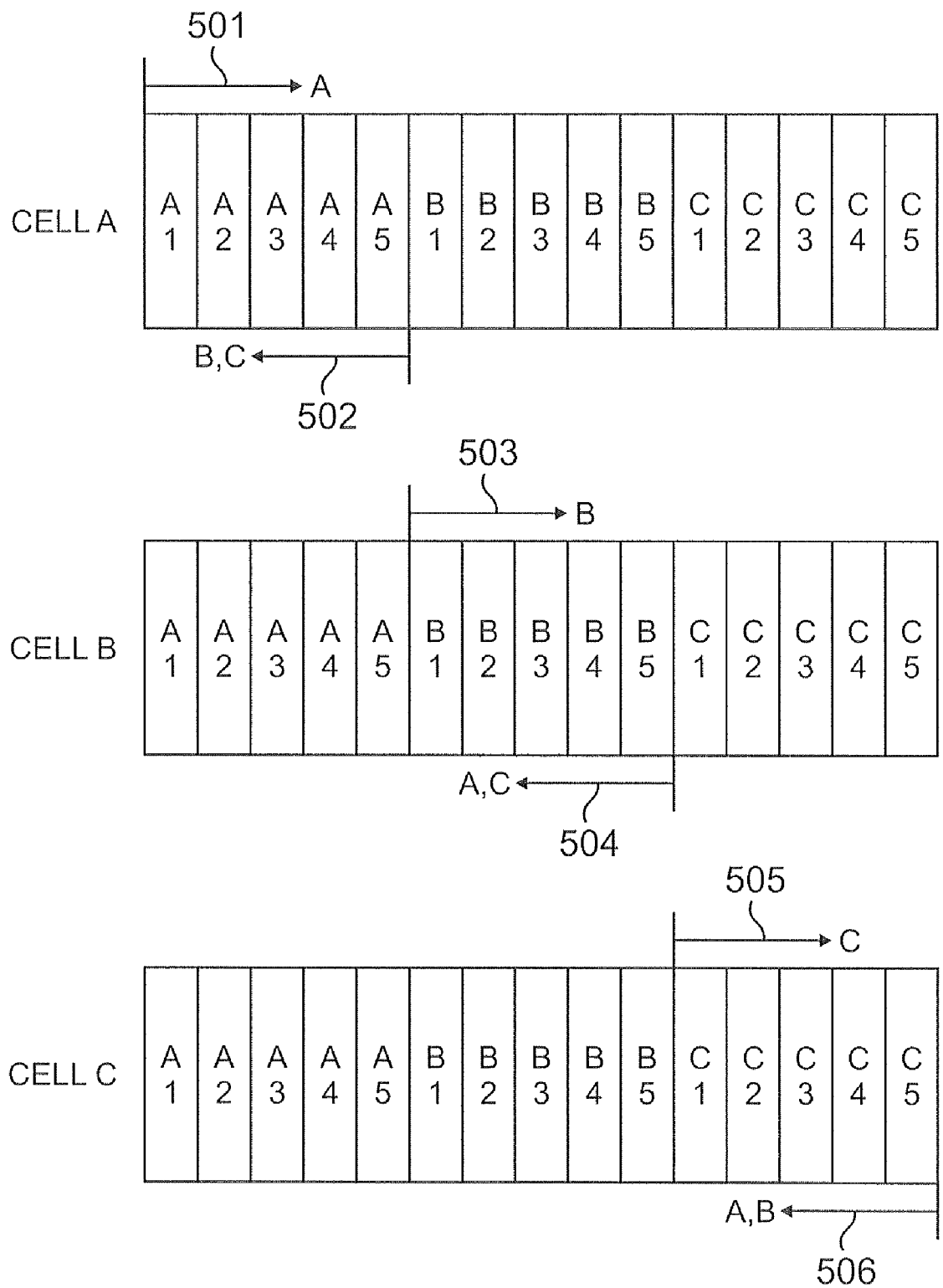
FIG. 5 illustrates flexible fractional frequency reuse according to the principles of the present disclosure.

FIG. 5 illustrates flexible fractional frequency reuse according to the principles of the present disclosure. The entire subcarrier spectrum of wireless network 100 is divided into a plurality of segments. In FIG. 5, three segments are used, but this is by way of example only. More than three segments or less than three segments may also be used.

The three segments are Segment A, Segment B and Segment C. Segment A comprises a plurality of resource sets allocated to Cell A, namely resource sets A1, A2, A3, A4 and A5. Segment B comprises a plurality of resource sets allocated to Cell B, namely resource sets B1, B2, B3, B4 and B5. Segment C comprises a plurality of resource sets allocated to Cell C, namely resource sets C1, C2, C3, C4 and C5. Cells A, B and C generically represent any of the cells in wireless network 100, including the cells associated with base stations 101, 102 and 103. Cells A, B and C are assumed to be neighboring cells.

Five resource sets are used in each segment by way of example only. More than five resource sets or less than five resource sets may also be used. Moreover, the number of resource sets allocated to different cells can be different. Each one of resource sets A1-A5, B1-B5, C1-C5 comprises one or more resource units that may be allocated to a subscriber station, where each resource unit comprises one or more subcarriers. By way of example, resource set A1 may comprise 16 subcarriers (contiguous or distributed) that may be allocated to SS 116, resource set A2 may comprise 16 subcarriers (contiguous or distributed) that may be allocated to SS 115, resource set A3 may comprise 16 subcarriers (contiguous or distributed) that may be allocated to SS 111, and so forth.

The available resource sets for a given cell (e.g., BS 102) are allocated or scheduled by main controller 235 according to the lowest resource set number and in an ascending order, as indicated by arrow 501, arrow 503, and arrow 505 in FIG. 5. For example, in Cell A, resource sets are allocated in the order: A1, A2, A3, A4, A5, assuming no lower numbered resource set becomes available. Similarly, in Cell B, resource sets are allocated in the order: B1, B2, B3, B4, B5, and in Cell C, resource sets are allocated in the order: C1, C2, C3, C4, C5.

Since main controller 235 always allocates the available resource set having the lowest number, if resource sets A1, A2 and A3 are initially in use and resource set A2 becomes available, the next subscriber station to be scheduled will be allocated resource set A2, not resource set A4. Thus, the scheduling and allocation algorithm disclosed herein is not a round-robin algorithm.

If a base station runs out of its allocated resources, main controller 235 may begin allocating resources from the sets of resource units reserved for other cells according to predefined rules. In particular, main controller 235 may allocate available resource sets normally reserved for other cells according to the highest resource set number and in a descending order of allocation, as indicated by arrow 502, arrow 504, and arrow 506 in FIG. 5.

For example, if Cell A runs out of resource sets, Cell A may allocate resources from Cell B and Cell C set on an alternating basis. In the example of FIG. 5, after running out of its own resources, Cell A allocates resource sets to new subscriber stations in Cell A in the order: B5, C5, B4, C4, B3, C3, and so on, as indicated by arrows 504 and 506. Similarly, if Cell B runs out of resource sets, Cell B allocates resource sets to new subscriber stations in Cell B in the order: A5, C5, A4, C4, A3, C3, and so on, as indicated by arrows 502 and 506.

The above-described strategy of resource unit allocation minimizes the probability of multiple cells using the same resource units when the system is not fully loaded. Since each cell allocates the available resource set having the lowest resource set number first, resource sets A1, B1 and C1 are the resource sets that are most likely to be in use by Cells A, B and C, respectively. For the same reason, the resource sets A5, B5 and C5 are the resource sets that are the least likely to be in use by Cells A, B and C, respectively. Since borrowing cells borrow the resource sets according to the highest resource set number (i.e., A5, B5, C5), the borrowing cells advantageously borrow the resource sets that are least likely to be in use by the neighboring (or lender) cell. Thus, the borrowing algorithm disclosed herein reduces the interference between neighboring cells.

Figure 6:
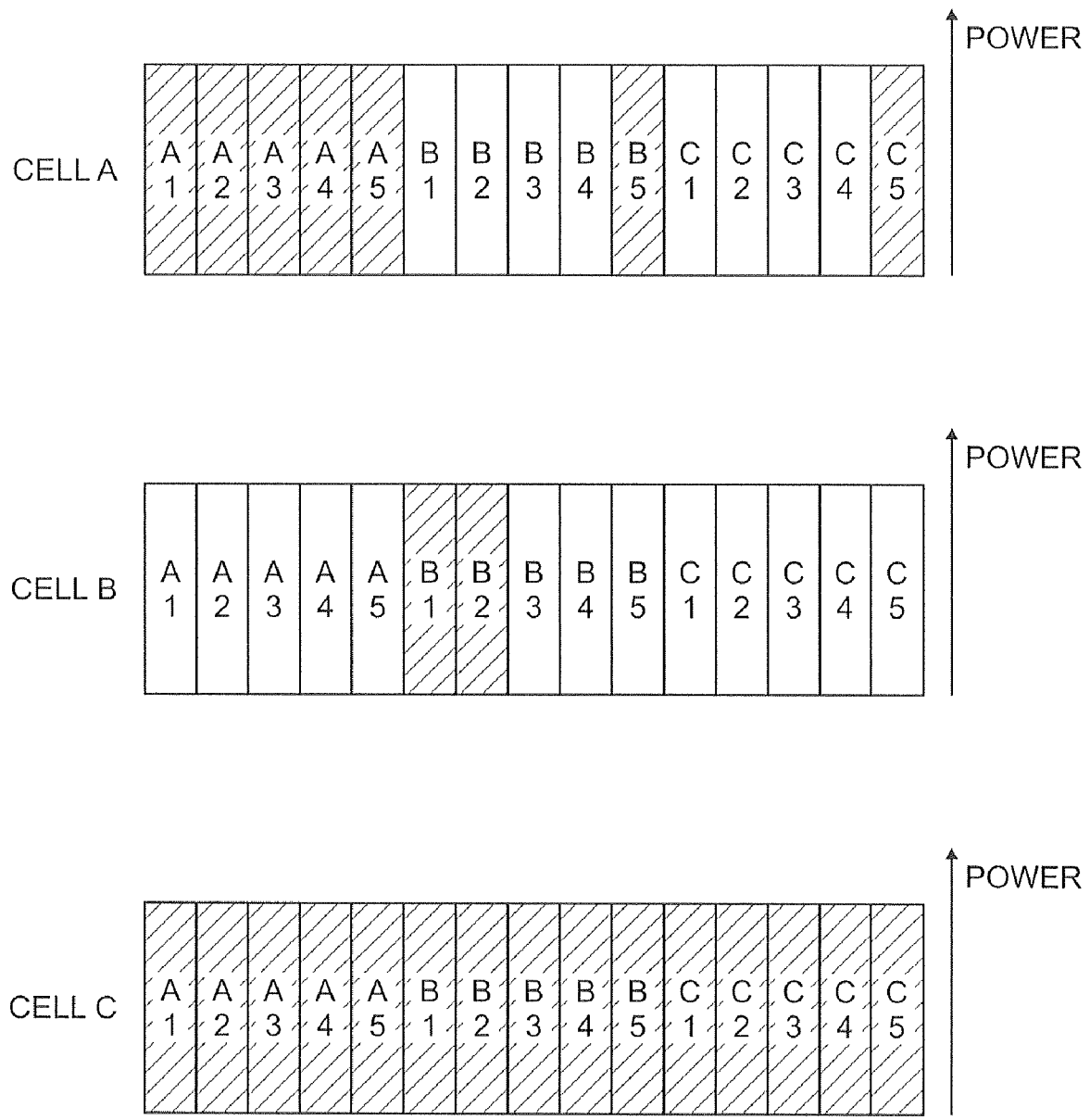
FIG. 6 illustrates flexible fractional frequency reuse according to the principles of the present disclosure.

FIG. 6 illustrates flexible fractional frequency reuse according to the principles of the present disclosure. Cell A is using all of its own resource sets, as indicated by the shading of resource sets A1-A5, and is borrowing two extra resource sets, as indicted by the shading of resource sets B5 and C5. Cell B is using only two resource units, as indicated by the shading of resource sets B1 and B2, as is not borrowing resource sets from Cell A or Cell C. However, Cell C is fully loaded. Thus, Cell C is using all of its own resource sets and is borrowing all of the resource sets of Cell A and Cell B, as indicated by the shading of resource sets A1-A5, B1-B5, and C1-C5.

Figure 7:
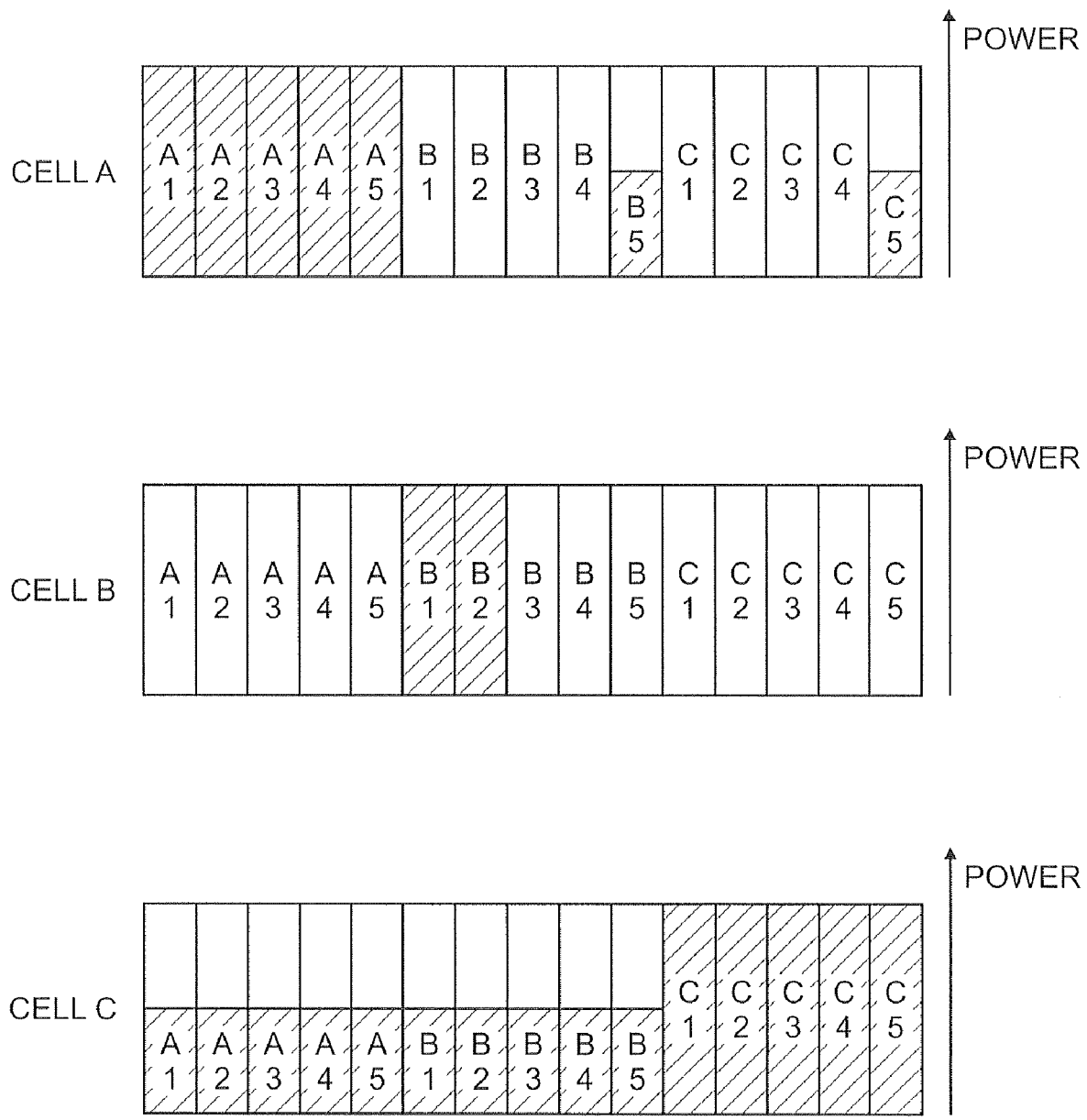
FIG. 7 illustrates flexible fractional frequency reuse according to the principles of the present disclosure.

FIG. 7 illustrates flexible fractional frequency reuse according to the principles of the present disclosure. In FIG. 7, the transmit power used on resource sets borrowed from other cells is lower than the transmit power used on the dedicated resource sets normally allocated to the borrowing cell. For example, when Cell A borrows resource sets B5 and C5 from Cell B and Cell C respectively, the base station in Cell A transmits at a lower power level on the subcarriers in resource sets B5 and C5, as indicated by the partial shading of resource sets B5 and C5 in FIG. 7. Similarly, Cell C transmits at a lower power level on resource units A1-A5 and B1-B5 borrowed from Cell A and Cell B.

According to the principles of the present disclosure, the resource units borrowed from other cells are preferably allocated to good (i.e., strongly received) subscriber stations in the borrowing cell. By way of example, in FIG. 7, Cell A allocates borrowed resource sets B5 and C5 to subscriber stations that are strongly received in the base station in Cell A. The good subscriber stations are generally located closer to the base station and have a higher signal-to-interference and noise ratio (SINR).

This method of allocation and transmit power control enables the base station to serve a strongly received subscriber stations with a lower transmit power on a borrowed resource set. The lower transmit power on the borrowed resource set also guarantees lower inter-cell interference. Thus, the lower transmit power used by Cell A on the subcarriers in borrowed resource sets B5 and C5 creates lower interference in resource set B5 in Cell B and in resource set C5 in Cell C.

Additionally, even if a cell is not using all the resource sets normally allocated to the cell, the cell still may serve a good subscriber station with a lower transmit power. Thus, Cell B may use full transmit power on the subcarriers in resource set B2 to serve a subscriber station having low SINR in the base station and may use reduced transmit power on the subcarriers in resource set B1 to serve a subscriber station having high SINR in the base station.

Figure 8:
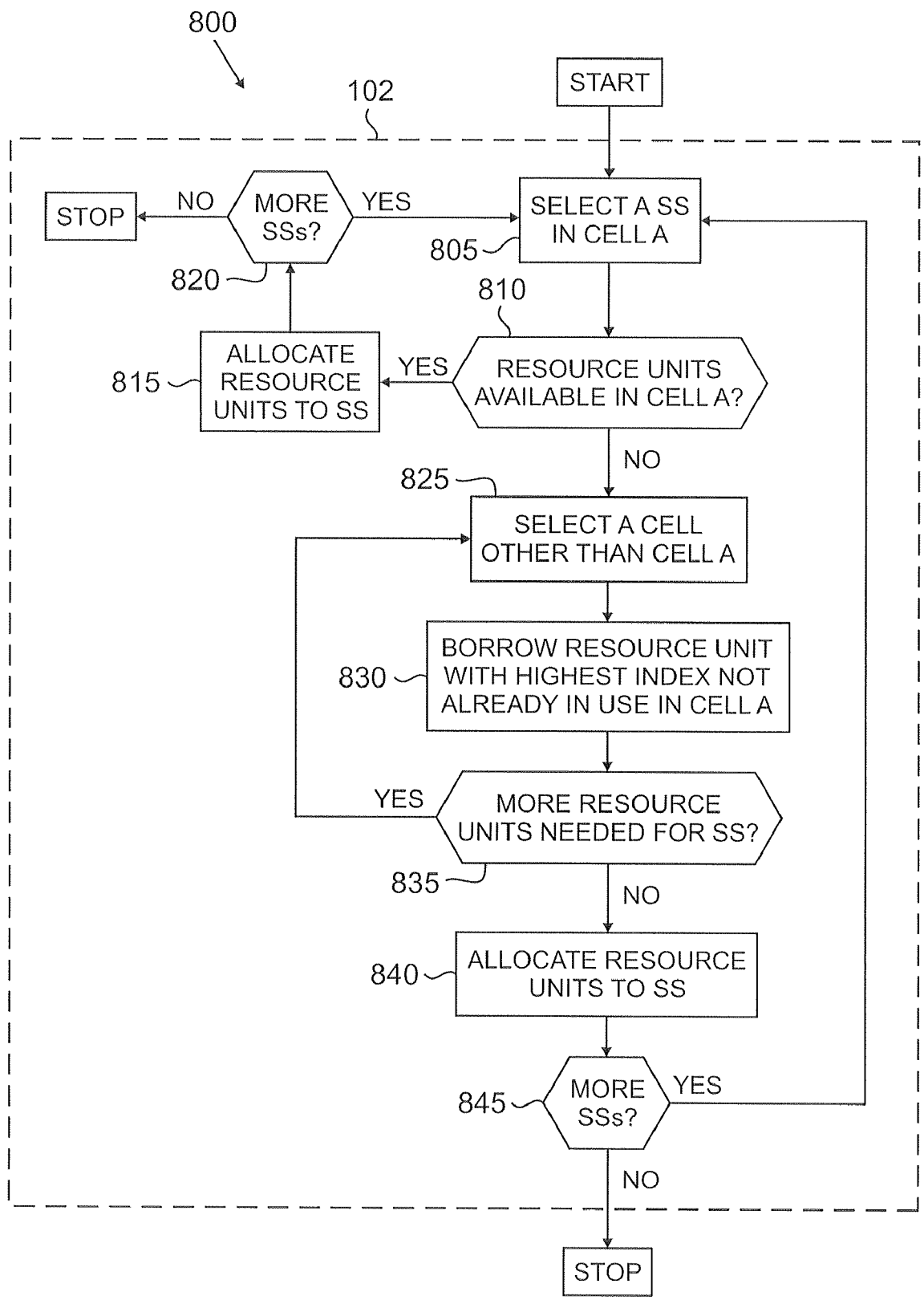
FIG. 8 is a flow diagram illustrating resource allocation in an exemplary base station according to one embodiment of the present disclosure.

FIG. 8 depicts flow diagram 800, which illustrates resource allocation in base station (BS) 102 according to one embodiment of the present disclosure. BS 102 is assumed to be Cell A in flow diagram 800. Initially, BS 102 selects a new subscriber station (e.g., SS 116) to be allocated resource units (i.e., subcarriers) in Cell A (process step 805). Next, BS 102 determines if at least one resource set (i.e., group of subcarriers) is available in Cell A (process step 810).

If resource units are available in Cell A (e.g., resource set A1), then BS 102 allocates the available resource units to SS 116 (process step 815) and then determines if more subscriber stations are accessing BS 102 (process step 820). If more subscriber stations are attempting to access BS 102, the process returns to step 805. If no more subscriber stations are attempting to access BS 102, the process stops.

If resource units are not available in Cell A (i.e., a NO in step 810), then BS 102 selects a neighboring cell (e.g., BS 101) from which to borrow available resource units (process step 825). BS 102 then borrows (i.e., selects for allocation)

the resource unit having the highest resource set number (index) that is not likely to be in use in the neighboring cell and is not already in use (i.e., borrowed) in Cell A (process step 830).

BS 102 then determines if more resource units are need for SS 116 (process step 835). If more resource units are needed by SS 116, then BS 102 returns to step 825 and selects another neighboring cell (e.g., BS 103) from which to borrow. Steps 825, 830 and 835 are repeated until enough resource units from neighboring cells have been borrowed (i.e., selected for allocation) to satisfy SS 116. When no additional resource units are needed by SS 116 (i.e., a NO in step 835), BS 102 allocates to SS 116 the borrowed resource units (process step 840).

BS 102 then determines if more subscriber stations are accessing BS 102 (process step 845). If more subscriber stations are attempting to access BS 102, the process returns to step 805. If no more subscriber stations are attempting to access BS 102, the process stops. It is noted that it is possible that SS 116 to be allocated some resource units from the pool of resource units normally allocated to BS 102 and to be allocated some borrowed resource units from a neighboring cell.

Figure 9:
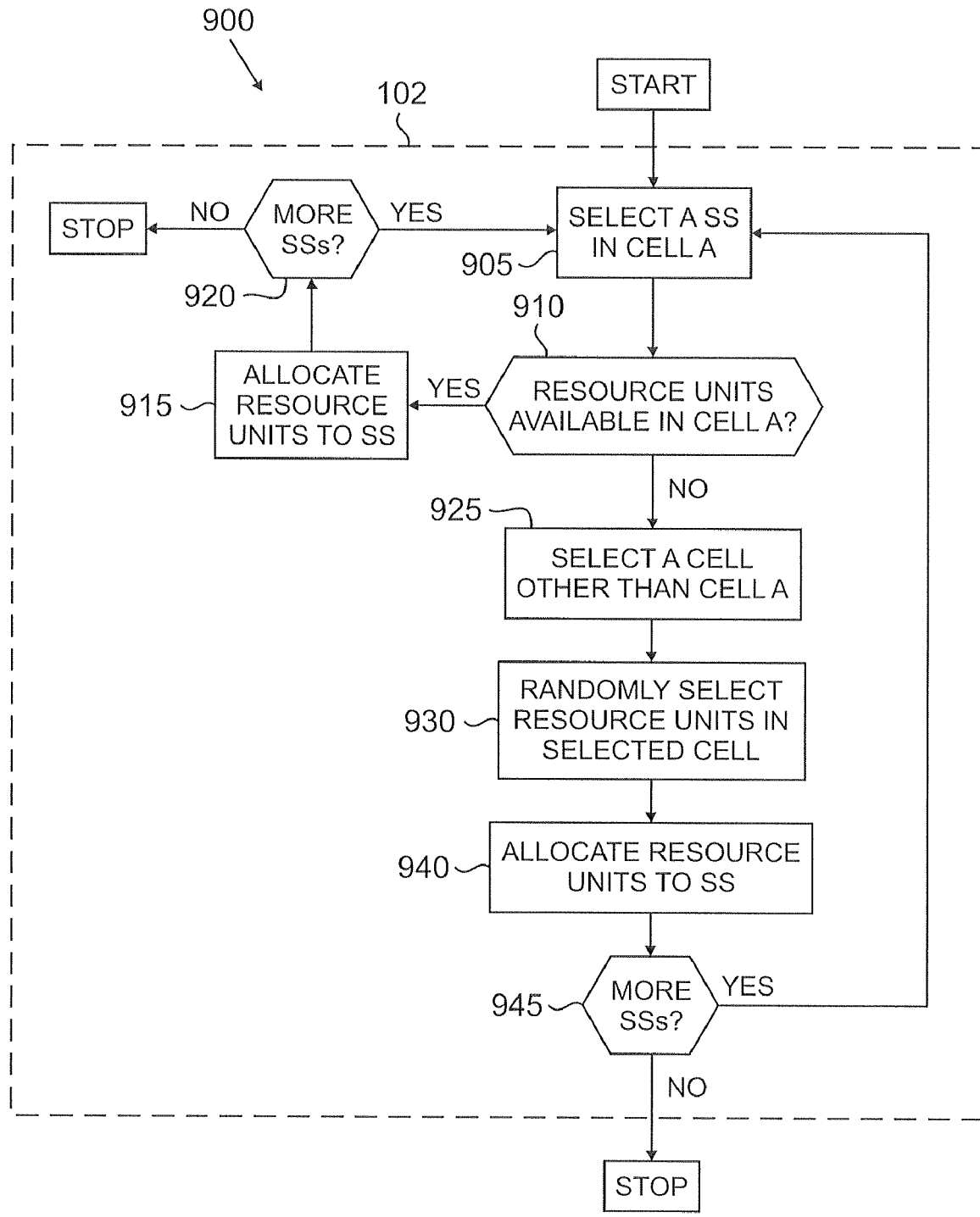
FIG. 9 is a flow diagram illustrating resource allocation in an exemplary base station according to another embodiment of the present disclosure.

FIG. 9 depicts flow diagram 900, which illustrates resource allocation in base station (BS) 102 according to another embodiment of the present disclosure. In FIG. 9, the resources from the neighboring (lender) cell are randomly selected, rather then selected by the highest index number, as explained above. Flow diagram 900 is similar in most respects to flow diagram 800. Initially, BS 102 selects a new subscriber station (e.g., SS 116) to be allocated resource units (i.e., subcarriers) in Cell A (process step 905). Next, BS 102 determines if at least one resource set (i.e., group of subcarriers) is available in Cell A (process step 910).

If resource units are available in Cell A (e.g., resource set A1), then BS 102 allocates the available resource units to SS 116 (process step 915) and then determines if more subscriber stations are accessing BS 102 (process step 920). If more subscriber stations are attempting to access BS 102, the process returns to step 905. If no more subscriber stations are attempting to access BS 102, the process stops.

If resource units are not available in Cell A (i.e., a NO in step 910), then BS 102 selects a neighboring cell (e.g., BS 101) from which to borrow available resource units (process step 925). The neighboring cell may be selected at random. BS 102 then randomly selects for borrowing one or more resource units not likely to be in use in the neighboring cell and that are not already in use (i.e., borrowed) in Cell A (process step 930). BS 102 then allocates to SS 116 the selected resource units (process step 940).

BS 102 then determines if more subscriber stations are accessing BS 102 (process step 945). If more subscriber stations are attempting to access BS 102, the process returns to step 905. If no more subscriber stations are attempting to access BS 102, the process stops.

In an advantageous embodiment of the disclosure, the selection of resource units to be borrowed from the neighboring cells may be based on the channel quality experienced by the selected subscriber stations on the selected resource units. For example, if SS 116 reports good CQI data on resource sets B3 and C1, then Cell A may borrow resource sets B3 and C1 to serve SS 116, even though resources sets B3 and C1 may not have the highest resource set index numbers of the available resource sets in the neighboring cells.

In still another embodiment of the disclosure, some resource units may be exclusively reserved for use in a cell. Reserved resource units may be reserved to serve weak subscriber stations near the cell edge, thereby avoiding any potential collisions on these resource units. Thus, for example, resource sets A1, B1 and C1 may be exclusively reserved for use in Cell A, Cell B and Cell C, respectively. This arrangement guarantees high SINR on the reserved resource units due to lower inter-cell interference because these resource sets are not used in the neighboring cells.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless network capable of communicating according to a multi-carrier protocol, a base station operable to communicate with subscriber stations using a first pre-defined set of subcarriers, wherein the base station is configure to determine channel quality of the first subcarriers station, if additional subcarriers are available in the first pre-defined set of subcarriers to communicate with a first subscriber station and wherein the base station, in response to a determination that no additional subcarriers are available in the first pre-defined set, selecting a first subcarrier in a second pre-defined set of subcarriers allocated to a neighboring base station based upon the channel quality experienced by the first subscriber station, and borrows the first subcarrier in a second pre-defined set of subcarriers and allocates the first subcarrier in the second pre-defined set to communicate with the first subscriber station.

2. The base station as set forth in claim 1, wherein the base station allocates the first subcarrier in the second pre-defined set to communicate with the first subscriber station based on a determination that the first subscriber station has a high signal-to-interference and noise ratio.

3. The base station as set forth in claim 2, wherein the base station transmits on the first subcarrier in the second pre-defined set at a lower power level than the base station transmits on the subcarriers in the first pre-defined set of subcarriers.

4. The base station as set forth in claim 1, wherein the first subcarrier in the second pre-defined set is selected by the base station according to a determination that the first subcarrier in the second pre-defined set is the least likely of the second pre-defined set of subcarriers to be used by the first neighboring base station.

5. The base station as set forth in claim 1, wherein the first subcarrier in the second pre-defined set is selected randomly by the base station.

6. The base station as set forth in claim 1, wherein the base station, in response to the determination that no additional subcarriers are available in the first pre-defined set, selects a first subcarrier in a third pre-defined set of subcarriers used by a second neighboring base station and allocates the first subcarrier in the third pre-defined set to communicate with the first subscriber station.

7. The base station as set forth in claim 6, wherein the first subcarrier in the third pre-defined set is selected by the base station according to a determination that the first subcarrier in the third pre-defined set is the least likely of the third pre-defined set of subcarriers to be used by the second neighboring base station.

8. The base station as set forth in claim 6, wherein the first subcarrier in the third pre-defined set is selected randomly by the base station.

9. A wireless network comprising a plurality of base stations, each of the base station communicating with subscriber stations according to a multi-carrier protocol using a first pre-defined set of subcarriers, wherein the each base station is configure to determine channel quality of the first subcarriers station, if additional subcarriers are available in the first pre-defined set of subcarriers to communicate with a first subscriber station and wherein the each base station, in response to a determination that no additional subcarriers are available in the first pre-defined set, select a first subcarrier in a second pre-defined set of subcarriers allocated to a neighboring base station based upon the channel quality experienced by the first subscriber station, and borrows the second pre-defined set of subcarriers used by a first neighboring base station and allocates the first subcarrier in the second pre-defined set to communicate with the first subscriber station.

10. The wireless network as set forth in claim 9, wherein the each base station allocates the first subcarrier in the second pre-defined set to communicate with the first subscriber station based on a determination that the first subscriber station has a high signal-to-interference and noise ratio.

11. The wireless network as set forth in claim 10, wherein the each base station transmits on the first subcarrier in the second pre-defined set at a lower power level than the each base station transmits on the subcarriers in the first pre-defined set of subcarriers.

12. The wireless network as set forth in claim 9, wherein the first subcarrier in the second pre-defined set is selected by the each base station according to a determination that the first subcarrier in the second pre-defined set is the least likely of the second pre-defined set of subcarriers to be used by the first neighboring base station.

13. The wireless network as set forth in claim 9, wherein the first subcarrier in the second pre-defined set is selected randomly by the each base station.

14. The wireless network as set forth in claim 9, wherein the each base station, in response to the determination that no additional subcarriers are available in the first pre-defined set, selects a first subcarrier in a third pre-defined set of subcarriers used by a second neighboring base station and allocates the first subcarrier in the third pre-defined set to communicate with the first subscriber station.

15. The wireless network as set forth in claim 14, wherein the first subcarrier in the third pre-defined set is selected by the each base station according to a determination that the first subcarrier in the third pre-defined set is the least likely of the third pre-defined set of subcarriers to be used by the second neighboring base station.

16. The wireless network as set forth in claim 14, wherein the first subcarrier in the third pre-defined set is selected randomly by the each base station.

17. A method for use in a base station of a wireless network, whereto the base station communicates with subscriber stations using a first pre-defined set of subcarriers, the method comprising the steps of:

determining, by the base station, if additional subcarriers are available in the first pre-defined set of subcarriers to communicate with a first subscriber station; in response to a determination that no additional subcarriers are available in the first pre-defined set, determining channel quality of the first subscriber station, selecting a first subcarrier in a second pre-defined set of subcarriers allocated to a neighboring, base station based upon the channel quality experienced by the first subscriber station, and allocating, by the base station, the first subcarrier in the second pre-defined set to communicate with the first subscriber station.

18. The method as set forth in claim 17, wherein the step of allocating the first subcarrier in the second pre-defined set comprise the sub-step of determining that the first subscriber station has a high signal-to-interference and noise ratio.

19. The method as set forth in claim 18, further comprising the step of transmitting on the first subcarrier in the second pre-defined set at a lower power level than the base station uses to transmit on the subcarriers in the first pre-defined set of subcarriers.

20. The method as set forth in claim 17, wherein the step of selecting the first subcarrier in the second pre-defined set comprises the sub-step of determining that the first subcarrier in the second pre-defined set is the least likely of the second pre-defined set of subcarriers to be used by the first neighboring base station.

21. The method as set forth in claim 17, wherein the first subcarrier in the second pre-defined set is selected randomly by the base station.

22. The method as set forth in claim 17, further comprising the steps of:

in response to the determination that no additional subcarriers are available in the first pre-defined set, selecting a first subcarrier in a third pre-defined set of subcarriers used by a second neighboring base station; and allocating the first subcarrier in the third pre-defined set to communicate with the first subscriber station.

23. The method as set forth in claim 22, wherein the step of selecting the first subcarrier in the third pre-defined set comprises the sub-step of determining that the first subcarrier in the third pre-defined set is the least likely of the third pre-defined set of subcarriers to be used by the second neighboring base station.

24. The base station of claim 6, wherein the first subcarrier in the third pre-defined set is selected randomly by the base station.

* * * * *